(12) United States Patent
Bornak et al.

(10) Patent No.: US 7,799,228 B2
(45) Date of Patent: Sep. 21, 2010

(54) METHOD FOR REDUCING NATURAL ORGANIC FOULING LEVELS IN A CONTAMINATED ION EXCHANGE RESIN

(75) Inventors: William E. Bornak, Richboro, PA (US); Robert Finley, Richboro, PA (US); Frank Eckert, Calhoun, LA (US)

(73) Assignee: ReStore + Inc., Warminster, PA (US)

( * ) Notice: Subject to any disclaimer, the term of this patent is extended or adjusted under 35 U.S.C. 154(b) by 820 days.

(21) Appl. No.: 11/469,502

(22) Filed: Sep. 1, 2006
(Under 37 CFR 1.47)

(65) Prior Publication Data
US 2008/0041789 A1 Feb. 21, 2008

Related U.S. Application Data

(60) Provisional application No. 60/713,961, filed on Sep. 2, 2005, provisional application No. 60/783,011, filed on Mar. 16, 2006.

(51) Int. Cl.
*B01J 49/00* (2006.01)
(52) U.S. Cl. .......................................... 210/673; 521/26
(58) Field of Classification Search ................. 210/673; 521/26; 502/12
See application file for complete search history.

(56) References Cited

U.S. PATENT DOCUMENTS 3,262,876 A * 7/1966 Hronas et al. ................ 210/673
3,787,339 A * 1/1974 Hodgdon et al. ............... 521/26
3,791,866 A * 2/1974 Kunin et al. ................ 127/46.2
3,932,278 A 1/1976 Meidl et al.
3,993,538 A 11/1976 Lebowitz et al.
4,108,769 A 8/1978 Krieg et al.
4,153,761 A 5/1979 Marsh
4,312,840 A 1/1982 Habib, Jr. et al.
4,391,649 A 7/1983 Shimizu et al.
4,483,754 A 11/1984 Shiroki
4,496,667 A 1/1985 Reichgott et al.
4,511,676 A 4/1985 Reichgott et al.
4,664,811 A 5/1987 Operhofer
4,770,790 A 9/1988 Oberhofer
4,853,143 A 8/1989 Hardy et al.
4,877,558 A 10/1989 Morioka et al.
5,078,889 A 1/1992 Higgins et al.
5,082,570 A 1/1992 Higgins et al.
5,137,925 A 8/1992 Hodgdon
5,248,401 A 9/1993 Bridger et al.
5,443,740 A 8/1995 Schmitt
5,621,097 A 4/1997 Brown et al.
5,858,119 A 1/1999 Mayne
7,291,578 B2 11/2007 SenGupta et al.

OTHER PUBLICATIONS

PCT/US2006/034257—International Preliminary Report on Patentability & Written Opinion of International Searching Authority, Sep. 2, 2005.

(Continued)

*Primary Examiner*—Matthew O Savage
(74) *Attorney, Agent, or Firm*—Womble Carlyle Sandridge & Rice, PLLC (57) ABSTRACT

A method is provided for reducing natural organic fouling levels in contaminated ion exchange resins by contacting the resins with an oxidizing agent solution.

5 Claims, 3 Drawing Sheets

OTHER PUBLICATIONS

J.K. Rice et al., "Organic Fouling in Anion Exchange", International Water Conference, 1959, pp. 111-121, Cyrus Wm. Rice & Company.

N. W. Frisch et al., "Changes in Operating Characteristics of Anion Exchange Resins After Field Use", Proceedings of the International Water Conference, 1955, pp. 97-124.

R. Kunin et al., "Field Testing of Ion Exchange Resins", International Water Conference, 1958, pp. 133-145.

J.K. Sargent et al., "Five Year's Weak Base Anion Resin Experience on The Ohio River", International Water Conference, 1959, pp. 97-101.

I. Abrams et al., "Accelerated Oxidation Tests on Weak Base Anion Exchanger Resins", International Water Conference, 1963, pp. 90-93.

T. Mottershead, "High-Purity Water for Semiconductor Technology", Effluent and Water Treatment Journal, Jul. 1972, pp. 356-362.

S. Fisher et al., "What Really Happens to Organics in the Water Treatment System, Part II: The Fate of Organics in the Anion Exchange Cycle", Int'l Water Conf, 1985, pp. 18-29.

F.X. McGarvey et al., "Thermal Degradation of Strongly Basic Anion Exchange Resins in Caustic Regenerates", Proceedings of The International Water Conference, 1987, pp. 93-102.

M.C. Gottlieb, "Thermal Degradation of Strongly Basic Anion Exchange Resins in Caustic Regenerants", International Water Conference, 1987, pp. 101-102, 100, 99, 98 and 97.

C.J. Romero et al., "Regeneration of Anion Exchange Resins with Regular-Grade Diaphragm-Cell Caustic Soda: A Five-Year Plant Trial", Int'l Water Conference, 1988, pp. 522-527.

J.M. Symons et al., "The Use of Anion Exchange Resins for the Removal of Natural Organic Matter from Municipal Water", International Water Conference, 1992, pp. 92-123.

G.J. Grits et al., "The Significance and Limitations of Laboratory Resin Analyses in Evaluating Ion Exchange Operating Performance", Int'l Water Conference, 1988, pp. 89-98.

M. Keller, "Basic Ion Exchange for Residential Water Treatment", 1990s (this date is presumed), pp. 1 and 12-16.

M.J. McCoy, "Minimizing the Economic Impact of Organics on Ion Exchange Systems", International Water Conference, 1996, pp. 441-452.

F.J. DeSilva, "Removing Organics with Ion Exchange Resin", Water Conditioning and Purification Magazine, 1997.

"PuroNews", May 15, 2001, vol. 1, Issue 5.

"Water Treatment for Fossil Fuel Power Generation", DTI Technology Status Report, www.berr.gov.uk/files/file30687.pdf, Jan. 2006.

The Purolite Company, "The Fouling of Ion Exchange Resins and Methods of Cleaning", Purolite Application Guide, 2006, pp. 1-9.

The Dow Chemical Company, "DOWEX Ion Exchange Resins, Procedure for Brine Cleaning of Anion Resins", Tech Facts, Aug. 2002.

The Dow Chemical Company, "DOWEX Ion Exchange Resins, Preventing Biological Growth on Ion Exchange Resins", Tech Fact, pp. 1-2.

C. Gauthier et al., "Resin Cleaning of SAC and WAC Resins in SAGD-Enhanced Oil Recovery (EOR) Applications", Int'l Water Conference, 2008, pp. 1-10.

Declaration Regarding Prior Art executed by William E. Bornak, dated Feb. 4, 2009.

* cited by examiner

METHOD FOR REDUCING NATURAL ORGANIC FOULING LEVELS IN A CONTAMINATED ION EXCHANGE RESIN

This application claims benefit of U.S. Provisional Patent Application Nos. 60/713,961, filed Sep. 2, 2005 and 60/783,011, filed Mar. 16, 2006, the contents of which are fully incorporated herein by reference.

BACKGROUND OF THE INVENTION

Water purification by the use of ion exchange resins has been practiced since the late 1940s. Cationic mineral contaminants such as $Na^{+1}$, $Ca^{+2}$, and $Mg^{+2}$ are removed by a cation exchange resin. Anionic mineral contaminants such as $Cl^{-1}$, $SO_4^{-2}$ are removed by an anion exchange resin. Nonionic species, such as $CO_2$ and silica, are also removed by an anion exchange resin; these species become anionic upon passage into the high pH environment of the anion resin.

Ion exchange, for the most part, is a batch process. The resins are in separate vessels for a primary demineralizer and the charged contaminants are removed during a service cycle. When the resins become saturated and no longer capable of purifying water, they are taken off-line and subjected to a rejuvenation process termed regeneration. Cation resins are regenerated with ambient dilute acid solutions; anion resins are treated with warmed dilute caustic solutions. These regenerant solutions strip off the service ions, allowing the resins to then be used over again in another service cycle.

Many demineralizer systems are installed in water plants using surface supplies as their source of raw water. This includes rivers, streams, and lakes. (Ion exchange cannot be used on sea water.) Surface waters are prone to contamination with "natural organics," a broad class of compounds arising from the microbial degradation of leaves and pine needles dropping into the surface sources. The organics typically impart a yellow or yellow-brown caste to the water.

The chemistry of natural organics is complicated and a great deal of research has been dedicated to the elucidation of their structure, mostly associated with the use of surface waters for potable applications. For industrial purposes, it is sufficient to describe the organics as follows:

Broad range of molecular weights (up to several million Daltons);
Overall negative charge, due to the presence of COOH (carboxylic acid) groups;
Complicated structure containing aromatic and aliphatic sub-structures;
Presence of imbedded Fe ions within the structures, most likely by a chelation-type mechanism; and
Geographical and seasonal variations in structural details.

Organic fouling occurs as the anion exchange resins remove the organics from the inlet water, but fail to release the organics during regeneration. Although the per-cycle loading is in the ppm (parts per million) range, the operation of the system over many dozens or hundreds of service/regeneration cycles results in the accumulation of a high level of fouling on the resins.

Organic fouling has a direct impact on the efficient operation of a demineralizer. There are two main mechanisms: (1) blockage of active groups, and (2) prolongation of the regeneration final rinse. The organics are large molecules, with multiple points of attachment to the ion exchange resin's active sites. They can block access of the normal service ions ($Cl^{-1}$, $SO_4^{-2}$, etc.), leading to a shortened run. In addition, the organics trapped within the polymeric structure of the resin absorb $Na^{+1}$ ions from the regenerant caustic, forming COONa. The latter slowly hydrolyzes, releasing $Na^{+1}$ ions into the final rinse step of the regeneration process. The end of the final rinse is predicated on a drop in conductivity to a pre-determined value, typically <15 µS. A high $Na^{+1}$ background will raise the conductivity, prolonging the rinse step.

During the final rinse, service water goes through the cation and anion vessels. The final rinse is "service to sewer," because the water is discarded. A prolongation of the final rinse, however, subtracts time from the next service cycle. Quite often, a resin vessel which requires an overly long final rinse will give a shortened service cycle directly after. A shortened service cycle requires more frequent regenerations to purify a given amount of water, thus increasing the consumption of acid and caustic used in the regeneration process.

Ion exchange is also used in non-water treatment related applications, such as the decolorization of liquid sugar solutions and the removal of unwanted acidic and basic species from organic product streams. Decolorization resins become fouled with materials similar to naturally occurring organic foulants, but, due to their higher concentration in the sugar solution, fouling occurs more rapidly and to a greater extent than in conventional water treatment. The resins used in these applications are very expensive and, prior to this patent application, it is believed that no effective cleaning protocol had been developed.

There have been many attempts to remove the organic fouling from anion resins. Most revolve around the use of strong brine solutions, typically 10% or more. In the presence of these solutions, the organics are induced to leave the resin and diffuse out into the brine. This can be readily seen even within a few minutes of contacting of resin and brine: the solution quickly becomes tinged with a yellow or orange or red-brown. The variations in color are believed to arise from geographical variations in the exact structure of the organics.

The evolution of color has been used as a measure of the level of fouling. After a 24-hour exposure, usually to a warmed brine solution, the color in the brine can be compared against a VCS (Varnish Color Standard) chart, which documents colors from a VCS of #1, which is water white, to a VCS #18, which is opaque black. Heavy organic fouling usually generates a VCS of #8 to #16.

An alternate method is to measure the TOC (Total Organic Carbon) in the brine solution. This requires a very sophisticated analytical instrument, of which there are several brands on the market. Heavy organic fouling is usually indicated by a TOC value in the brine of 1500 to 6000 ppm.

Unfortunately, all the methods based on the above basic approaches are "method dependent," in which the test value depends on the method used. This makes inter-laboratory comparisons difficult, although each lab's results can be internally consistent.

The evolution of the color from the resin into a brine solution also provides the basis for a cleaning procedure. Practitioners throughout the resin industry have published many procedures based on the use of brine by itself or in combination with caustic (NaOH). Some of the procedures are quite elaborate, with multiple soaking periods in between brining steps.

Results of the use of brine/caustic are highly variable, ranging from a minimum of 10% removal to 90% removal, with even optimized procedures providing only variable results, typically 50-80% removal.

Accordingly, a need exists for an improved cleaning method for ion exchange resins.

SUMMARY OF THE INVENTION

The present invention provides methods for cleaning ion exchange resins which include the use of an oxidizing agent, as well as a free radical scavenger to protect the active groups of the ion exchange resin.

In one aspect, the invention relates to a method of reducing natural organic fouling levels in contaminated ion exchange resins by contacting the resins with an oxidizing agent, with or without additives, in concentrations between 0.1 and 12.5%. In certain embodiments, the method can remove from about 80 to about 99% of the natural organic fouling. The ion exchange resin can be an anion or cation exchange resin. In certain embodiments, the ion exchange resin is an anion exchange resin.

In some embodiments, the resins are contacted with the oxidizing agent for a period of time from about 15 minutes to about 5 hours. In other embodiments, the resin is contacted with the oxidizing agent for a period of time from about 60 to about 90 minutes. In still other embodiments, the amount of time is determined according to the initial level of natural organic fouling.

In some embodiments, the temperature of the oxidizing agent contacting the resin can be from about 75° F. [25° C.] (or any ambient indoor or outdoor temperature associated with the environment where workers may be carrying out the method of the invention) and about 120° F. (49° C.). The temperature can also be from about 32° F. (0° C.) to about 140° F. (60° C.).

In some embodiments, the method can result in increases in the amount of natural organics over the amounts measured in conventional brine elution Total Organic Carbon (TOC) tests.

In some embodiments, the effectiveness of the method is enhanced by treating the fouled resin with from about 1 to about 25% sodium chloride solutions which are also between about 0.1 and about 5% in sodium hydroxide for times between about 15 minutes and about 3 hours as an initial or conditioning step, before the addition of the oxidizing agent. The sodium chloride/sodium hydroxide solutions can be heated to 120° F. [49° C.]. Gentle, air-based agitation can also be used during the exposure of the resin to said sodium chloride/sodium hydroxide solutions. Gentle mechanical agitation can also be used during the exposure of the resin to said sodium chloride/sodium hydroxide solutions.

Additives that may be included along with the oxidizing agent according to the method of the invention include the sodium salt of an alkyl- or aryl-substituted benzene sulfonate (Additive A) wherein the alkyl group may range from a saturated $C_{10}$ to $C_{22}$ and the aryl group may be a substituted benzyl group in which the substitutions range from mono-, di-, and tri-methyl to mono-, di-, and tri-ethyl groups, and a polyethylene oxide (alpha-(nonylphenyl)-omega-hydroxy-poly(oxy-1,2-ethanediyl) (Additive B). Additives A and B may range in concentration between 50 and 5000 ppm.

In another embodiment, free radical scavengers are added to the cleaning solutions to provide some protection to the quaternary and tertiary amine structures of the ion exchange resin. The latter are the "active groups" of the resin, which support the water purification chemistry. The free radical scavengers include, but are not limited to, the following additives: 4-oxo-TEMPO [4-oxo-2,2,6,6-tetramethyl-1-piperidine-4-one], TEMPOL [4-hydroxy-TEMPO], CP—H [1-hydroxy-c-carboxy-2,2,5,5-tetramethylpyrrolidone, HCl salt], TEMPONE-H [1-hydroxy-2,2,6,6-tetramethyl-4-oxo-piperidine, HCl salt], CDMIO-K [4-carboxy-2,2-dimethyl-2H-imidazole-1-oxide, K], CM-H [1-hydroxy-3-methoxycarbonyl-2,2,5,5-tetramethylpyrrolidine, HCl salt], DEPMO [5-(diisopropoxyphosphoryl)-5-methyl-1-pyrroline-N-oxide], DIPPMPO [5-(diisopropoxyphosphoryl)-5-methyl-1-pyrroline-N-oxide], DMPIO [2-dimethyl-4-phenyl-2H-imidazole-1-oxide], and DEDC [diethyldithiocarbamic acid, sodium salt]. One skilled in the art will appreciate that a variety of free radical scavengers will be useful according to the methods of the invention. Appropriate free radical scavengers can be selected that are sufficiently water soluble at alkaline pH to provide efficacy and ease of use under field conditions, but that are also cost-effective at use concentrations, pose no danger to customer waste treatment facilities, and have no deleterious environmental impact.

In another aspect of the invention, the benefits of the method are achieved with no measurable deleterious effect on the total ion exchange capacity and salt splitting (strong base) capacity of strong base anion resins or so-called intermediate base resins, or the total ion exchange capacity of weak base anion resins.

The backbone or matrix of the resin(s) can be acrylic, styrenic, or phenolic; crosslinked with commonly used crosslinking agents such as divinyl benzene, or ethylene glycol dimethracrylate; or where uncommonly used cross-linking agents are used in the synthesis of the copolymer.

The copolymer of the resin can be gellular or macroporous (also termed macroreticular). The copolymer of the resin can be heterodisperse or mono-disperse in resin bead particle size distribution. Strong base anion resin can be of the Type I (trimethyl-amino-) or Type II (hydroxyethyl-dimethyl-amino) chemistry.

The strong base and weak base resins utilized can be in separate service vessels, combined in a single vessel with separate compartments (Bayer Schwebebett®) or in a single vessel in a layered configuration (Rohm and Haas Anion Stratabed®) or in a single vessel in a mixed configuration.

In certain embodiments, the method not only avoids any loss of capacity, a significant gain in salt splitting capacity can be achieved, as measured by laboratory tests of the resins exposed to the oxidizing agent according to the method of the invention. Further, in certain embodiments, improved ion exchange performance can be achieved, both as measured by the total volume of water treated in a given service cycle and as measured by the time required during the regeneration final rinse for the anion effluent to achieve "return to service" criteria, typically less than about 15 μS.

The method of the invention can also result in improvements in water quality, most notably lower operating sodium levels and consequent lower operating conductivity values. Also, use of the methods of the invention generally results in lower operating costs for the demineralizer system in which the anion resin is located, notably lower consumption of sodium hydroxide used in the regeneration process and a higher net production of demineralized or deionized water due to less frequent regenerations.

In one aspect of the invention, the method is performed on a periodic basis, ranging from about one to three times a year to about once every two to three years. The cleaning frequency can be determined by an analysis of the anion exchange resin, using a recognized test procedure for natural organic fouling. The choice of cleaning frequencies can also be made by measuring the total throughput of the system during a service cycle and/or the rinse down time required by the anion resin bed during the final rinse step of the regeneration process. A loss in total throughput of 5% or more and/or a rinse down time in excess of 60 minutes can indicate a level of natural organic fouling appropriate for cleaning.

Oxidizing agents useful according to the invention include but are not limited to, sodium hypochlorite, calcium hypochlorite, chlorine dioxide, bromine-substituted hypochlorite systems, mono-, di-, and tri-substituted chloramines, sodium persulfate, ammonium persulfate, and ozone, as well as the direct production of sodium hypochlorite in situ from gaseous chlorine and caustic solutions or from the electrolytic decomposition of sodium chloride solutions.

The methods of the invention can be used in connection with ion exchange applications related to water treatment and in other industrial process applications, such as decolorization of liquid sugar solutions and the removal of dissolved species, including acids and bases, from organic product streams. The methods can also be used in connection with cation exchange resin applications for microbiological control and the removal of anionic polymer fouling.

DESCRIPTION OF INVENTION

When evaluating the effectiveness of method for cleaning ion exchange resins, the concept of "resin capacity" is often employed. A discussion of relevant concepts is provided below, prior to presentation of results pertaining to use and testing of the methods of the invention.

The capacity of a resin is the measure of how many cations or anions a cation or anion exchange resin, respectively, can remove from a dilute mineral solution. The total concentration of cations is obtained by summing the individual cation species, such as $Na^{+1}$, $Ca^{+2}$, etc., after the concentrations have been converted to grains as $CaCO_3$ per gallon (in English) or milliequivalents per ml (in metric); likewise, mutatis mutandis, for the anions. The capacity of the resin is expressed in Kilograins as $CaCO_3$ per cubic foot (in English) or in equivalents per liter or milliequivalents per ml (in metric).

Strong base or salt splitting capacity is the ability of the resin to remove all anionic species, both weakly and strongly ionized, e.g., $SiO_2$ and $Cl^{-1}$, respectively. Weak base capacity is the ability to remove only strongly ionized species, represented by $Cl^{-1}$.

A problem arises with conventional strong base resins in that they contain both strongly basic and weakly basic capacity. Analytically, the two capacities can be measured separately by two tests. The first test measures strong base or salt splitting capacity. The second test measures total capacity, which includes both strongly and weakly basic capacities. Thus, herein, the capacities of the resins are expressed as Total Capacity (TC) and Salt Splitting Capacity (SSC).

All testing herein was performed according to established ASTM protocols (ASTM is the American Society for Testing Materials, which publishes an annual compendium of industry tests). Ion exchange resin analysis is included in the Water Subdivision. All lab results were originally reported in metric; some have been converted to English units.

One aspect of the present invention involves the use of sodium hypochlorite solutions of various strengths and for various times and with various additives. As detailed in the Table 1 below, solution strengths from 0.025% (250 ppm) to the maximum commercially available strength, 12.5% (125,000 ppm) have been examined. The possible need for a pretreatment step was also examined. The following experimental protocol was performed in the laboratory:

(1) 500 ml of organically fouled anion resin was treated with a 750 ml of sodium hypochlorite of the required concentration (diluted from 12.5% stock) for 30 minutes. The resin sample was a before-cleaning sample from a field cleaning with the former triple brine/caustic technique. The resin had been analyzed previously and thus furnished base-line data. A 150 ml sample of resin was withdrawn and plunged into 2 liters DI [deionized] water with immediate stirring. Upon settling, the DI liquid was decanted and replaced with 2 additional liters DI water, followed by settling and decantation. This was repeated a third time. After the third decantation, the resin was transferred to a 250 ml flask and treated with 1-2 grams sodium sulfite to ensure quenching of the hypochlorite. The sulfite solution was stirred vigorously and allowed to stand for 5 minutes. The 150 ml sample of resin was transferred to a 200 cc plastic bottle, suspended in DI water to fill the bottle, followed by settling and decantation of the rinse. This constituted one sample of resin for analysis. In this case the sample was "No Brine, 30 min. at 'x' concentration," where x was the requisite concentration as listed in Table 1 below.

(2) After 60 minutes of exposure, a second 150 ml sample from the hypochlorite solution of the required concentration, as prepared in (1), was withdrawn, plunged into 2 liters of DI water with immediate stirring, and subsequently treated identically to the latter stages of (1). This was "No Brine, 60 min. at "x," with x defined as in (1).

(3) One liter of fresh resin was transferred to a 1500 ml beaker and treated with 10% NaCl with was also 1% in NaOH, prewarmed to 120° F. [49° C.]. The resin was gently stirred with a magnetic stirrer on a hot plate. The temperature was maintained at 120° F. [49° C.]±10% by adjusting the temperature setting of the heater. The resin was exposed to the solution for 1 hour, duplicating field treatment.

(4) After 1 hour, 300 ml of resin was removed, drained on a buchner funnel with Whatman No. 1 filter paper under vacuum, and rinsed with DI water until the filtrate was colorless. The remaining 700 ml of resin was drained of the first batch of brine/caustic, and then exposed to a second batch of 10% NaCl which was also 1% in NaOH, prewarmed to 120° F. [49° C.], and returned to the stirrer/hot plat. The reserved 300 ml of resin was transferred into a 500 ml beaker and treated with the 400 ml of the requisite concentration of sodium hypochlorite.

(5) After 30 minutes exposure to hypochlorite, a 150 ml sample of resin was taken and treated identically to (1). This constituted the "1× Brine, 30 min. Hypo" sample. After 60 minutes exposure, a second 150 ml sample of resin was taken and treated identically to (2). This constituted the "1× Brine, 60 min. Hypo." sample.

(6) Of the remaining 700 ml resin from (4), 350 ml resin was withdrawn from the brine/caustic solution after 60 minutes. This was drained and rinsed as described in the first part of (4), transferred to a 500 ml beaker, and treated with the requisite concentration of sodium hypochlorite. 150 ml samples were withdrawn at 30 and 60 minutes, triple rinsed, and then quenched with sulfite as described in (1) and (2). These samples constituted the "2× Brine, 30 min. Hypo" and the "2× Brine, 60 min. Hypo" samples, respectively.

(7) The brine/caustic solution from the remainder of the resin from the second treatment with brine/caustic (4) was decanted from the resin and the resin was then exposed to a third batch of 10% NaCl which was also 1% in NaOH, pre-warmed to 120° F. [49° C.], and stirred on the stirrer/hot plate for 60 minutes, thus simulating a triple brine/caustic treatment as done in the field.

(8) After 60 minutes, the resin was isolated and rinsed with DI water, as described in (4), transferred to a 500 ml beaker and exposed to the requisite concentration of sodium hypochlorite for 30 or 60 minutes. Samples were withdrawn, rinsed by decantation, quenched with sulfite, and transferred to plastic sample bottles. These constituted the "3× Brine, 30 min. Hypo" and the "3× Brine, 60 min. Hypo" samples, respectively.

(9) After all samples for a given concentration of hypochlorite were collected, exactly 25 ml of settled resin was withdrawn from each plastic sample bottle, drained and partially dried in a buchner funnel with Whatman No. 1 paper under vacuum. The partially dried resin samples were quantitatively transferred to small plastic weighing tubs and allowed to air dry for several hours. The dried resin was quantitatively transferred to 3 ounce glass vials, to which was added exactly 25 ml of 10% NaCl. The vials were capped and immersed in a 105° F. [40° C.] water bath for 24 hours. Aliquots were withdrawn, diluted with DI water as required, and analyzed for TOC in a Sievers Model 850 TOC analyzer (see below). The remainder of the resin in the sample bottles was sent to an outside laboratory (ResinTech Inc., W. Berlin, N.J.) for the determination of Total Capacity and Salt Splitting Capacity (see above). The TOC and capacity data are given in Table 1.

In addition to the values listed below, tests were also conducted at 0.025% (250 ppm), 0.1% (1000 ppm), 0.5% (5000 ppm), and 1.0% (10,000 ppm) using the above protocol. No significant reduction (<5%) in organic fouling levels was seen at these lower concentrations and the results are not reported herein.

TABLE 1

Percent Removal of Organic Fouling

| Pretreatment; minutes exposure to hypochlorite | Sodium Hypochlorite Concentration | | | | |
|---|---|---|---|---|---|
| | 2.5% | 5.0% | 7.5% | 10.0% | 12.5% |
| No Brine, 30 min. Hypo. | 41.8 | 83.5 | 85.2 | 84.7 | 86.2 |
| No Brine, 60 min. Hypo. | 79.0 | 97.9 | 95.6 | 94.4 | 91.2 |
| 1X Brine, 30 min. Hypo. | 48.2 | 68.6 | 96.8 | 95.2 | 92.2 |
| 1X Brine, 60 min. Hypo. | 68.2 | 90.6 | 94.4 | 98.7 | 95.6 |

TABLE 1-continued

Percent Removal of Organic Fouling

| Pretreatment; minutes exposure to hypochlorite | Sodium Hypochlorite Concentration | | | | |
|---|---|---|---|---|---|
| | 2.5% | 5.0% | 7.5% | 10.0% | 12.5% |
| 2X Brine, 30 min. Hypo. | 55.8 | 97.3 | 94.3 | 92.5 | 93.8 |
| 2X Brine, 60 min. Hypo. | 75.5 | 98.2 | 99.3 | 99.1 | 97.5 |
| 3X brine, 30 min. Hypo. | 68.4 | 84.3 | 96.3 | 91.4 | 91.6 |
| 3X Brine, 60 min. Hypo. | 81.4 | 98.2 | 99.1 | 97.2 | 98.2 |

The 10% and 12.5% runs were with a different batch of fouled resin than the runs at lower concentrations. Thus, the overall lower removal rates might reflect differences in the intrinsic nature of the organics, rather than a methodologically important effect. It is widely know that some organics are "easier" to remove than others, and this does vary geographically. The precise structural mechanism behind this geographic difference is not known.

The foregoing data also establishes the effectiveness of a pre-treatment of the fouled resin with a single brine/caustic exposure. The exposure may vary in duration between 15 minutes and several hours.

The chemical effectiveness of the methods of the present invention can be superior to conventional brine/caustic treatment. In brine/caustic cleaning, the brine concentration is typically 10% NaCl combined with 1% NaOH. The organics are eluted from the resin by the combination of high ionic strength solution, high Na counter-ion concentration, and heat, typically 120° F. [49° C.]. The exact role of the minor concentration of NaOH is not clear. The elution process, however, is simply a removal of the organics by diffusion out of the resin into the cleaning solution. Because all diffusion reactions eventually become self-limiting by the process of back diffusion, the cleaning is normally repeated several times, each time with fresh brine/caustic.

The chemical effectiveness of the use of hypochlorite, and other oxidizing agents included in this patent, is generated by the chemical destruction of the organics on or within the polymeric matrix of the structure of the resin and in the cleaning solution itself. In most cases, only a single contacting of the resin and cleaning solution is needed. Evidence of chemical reaction is the slight rise in temperature often seen during the use of hypochlorite, on the order of 15-20° F. [8.3-11.1° C.]. One would expect oxidation to be exothermic, because chemical bonds are being broken.

In addition, the TOC in hypochlorite cleaning solutions after a typical cleaning has been measured. Reactions in the cleaning solution were suspended by the addition of a reducing agent, which in all cases was sodium sulfite, applied in powdered form at a level stoichiometric with the amount of oxidizing agent in the initial solution.

A key requirement to an effective cleaning operation is that no significant harm be done to the resin. While it can be easy to remove a given foulant with an extremely aggressive cleaning solution, the resin can be irreversibly damaged by such treatments. The following data graphs establish that, within the margin of error of the analytical technique, there is no loss of Total Capacity or Salt Splitting Capacity by the exposure of the resins according to the methods of the invention. See FIG. 1.

Figure 1:
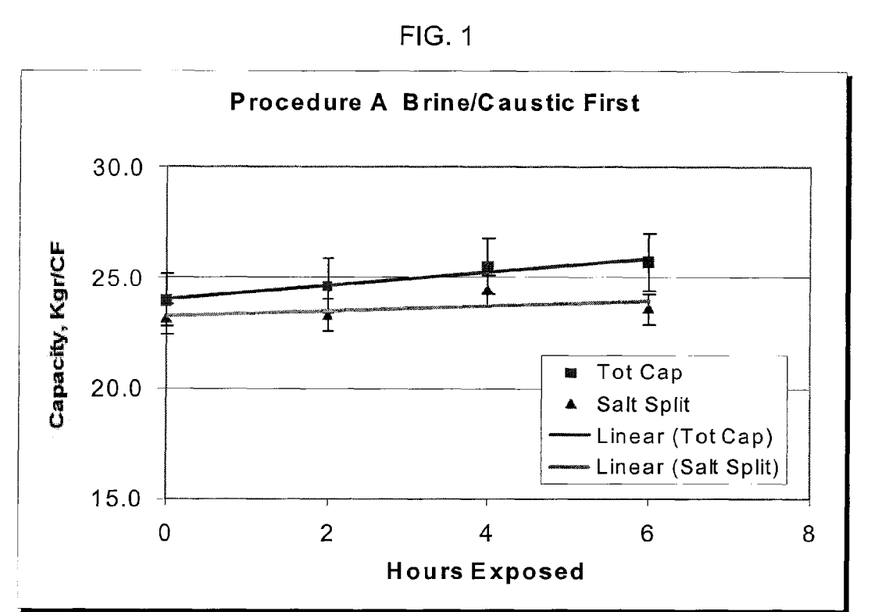
FIG. 1 is a graphic representation of data showing no loss of Total Capacity (Tot Cap) or Salt Splitting Capacity (Salt Split) by resins exposed to solutions according to one embodiment of the invention. The ordinate shows capacity in English units, Kilograins as $CaCO_3$ per cubic foot. The conversion factor is 1.0 meq/ml=21.8 Kgr/CF.

The data show not only no decrease in capacity, but the appearance of a gain in a capacity. The vertical bars for each data point represent the analytical accuracy of the test procedure, which is about 5%. The lines represent linear least squares curve fits to each data set. The upward trend in the curve fitting substantiates the claim of a slight gain in both total capacity and salt splitting capacity with this cleaning procedure.

Figure 2:
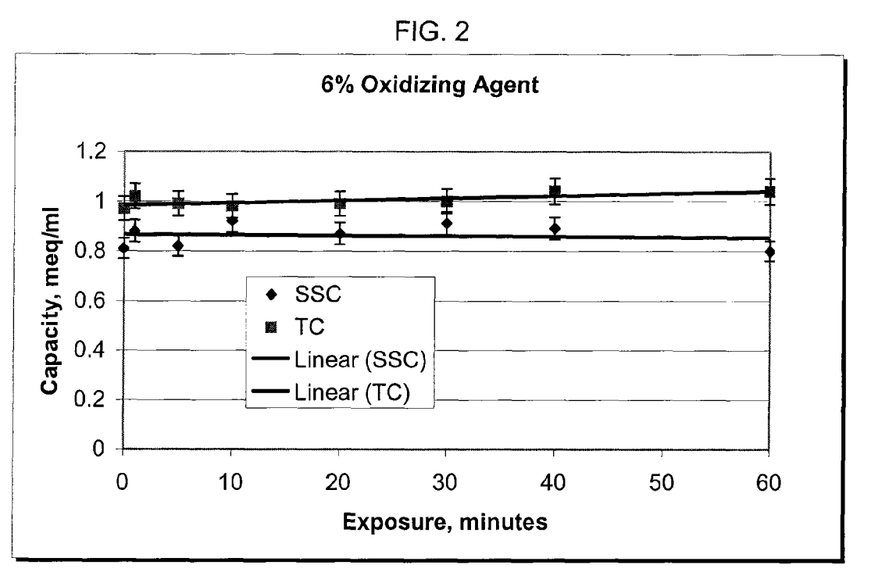
FIGS. 2 and 3 are graphic representations of data showing that, not only is no harm done to the resin as assessed by the total capacity and salt splitting capacity, but there is a slight gain in capacities using 6% and 10% oxidizing agent, respectively, according to particular embodiments of the invention. The ordinate is capacity expressed as milliequivalents per ml of wet resin. SSC is Salt Splitting Capacity and TC is Total Capacity.
Figure 3:
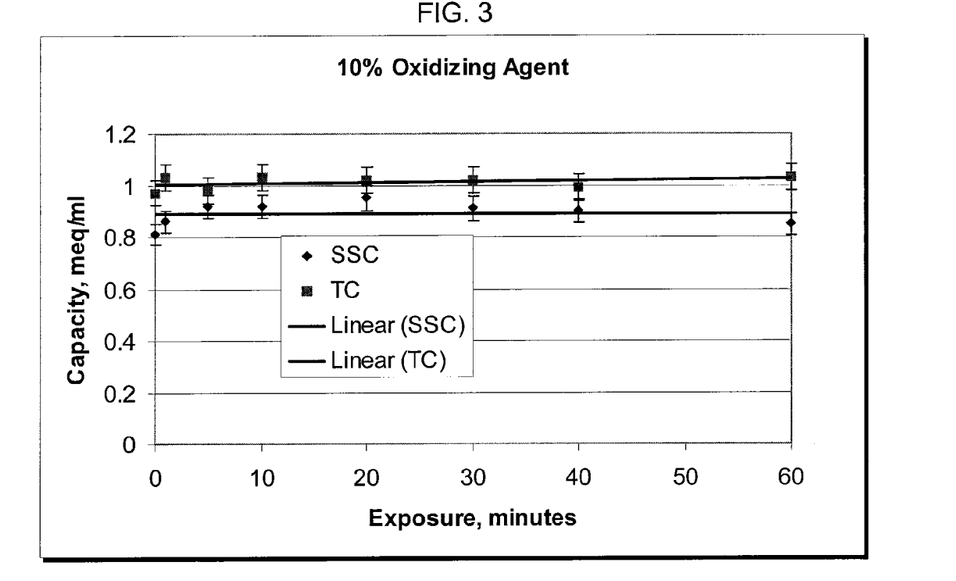

The data shown in FIG. 2 further illustrates that, not only is no harm done to the resin as assessed by the total capacity and salt splitting capacity, but there is a slight gain in capacities. In the graphs of FIGS. 2 and 3, the ordinate is capacity expressed as milliequivalents per ml of wet resin. In FIG. 1, the ordinate shows capacity in English units, Kilograins as $CaCO_3$ per cubic foot. The conversion factor is 1.0 meq/ml=21.8 Kgr/CF. TC is total capacity; SSC is salt splitting capacity.

Figure 4:
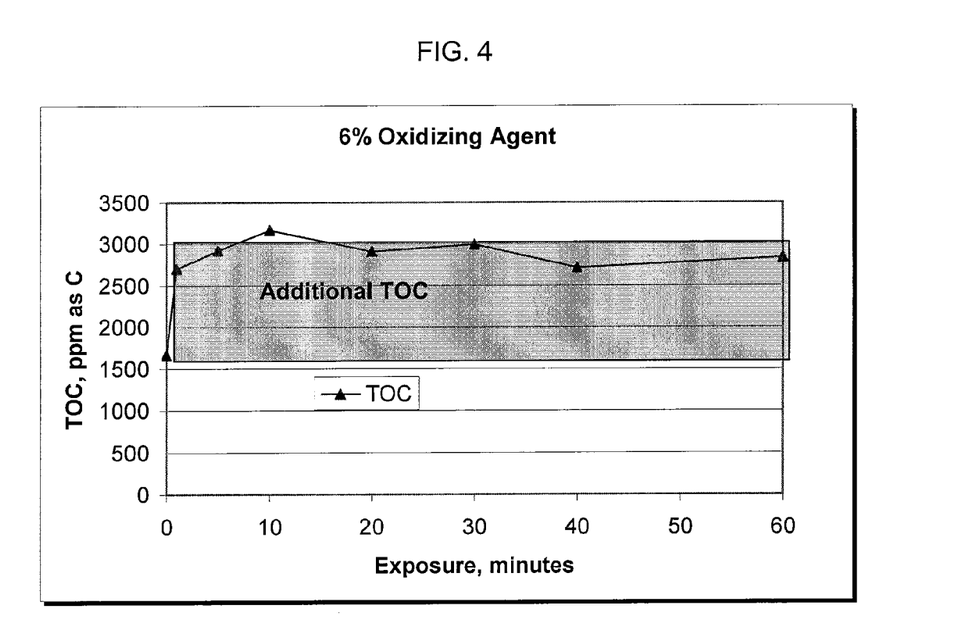
FIGS. 4 and 5 are graphic representations of data showing the appearance of additional or hidden organic fouling upon treatment of the resins to indicated concentrations of cleaning solution identified herein according to particular embodiments of the invention. The Total Organic Carbon (TOC) was measured on the cleaning solutions, not the resin, except for the initial reading at time 0. The latter establishes the standard organic fouling level as measured by the 24-hour warm brine elution test. Upon exposure to the oxidizing agent as described herein, "additional" TOC appears in the analytical results.
Figure 5:
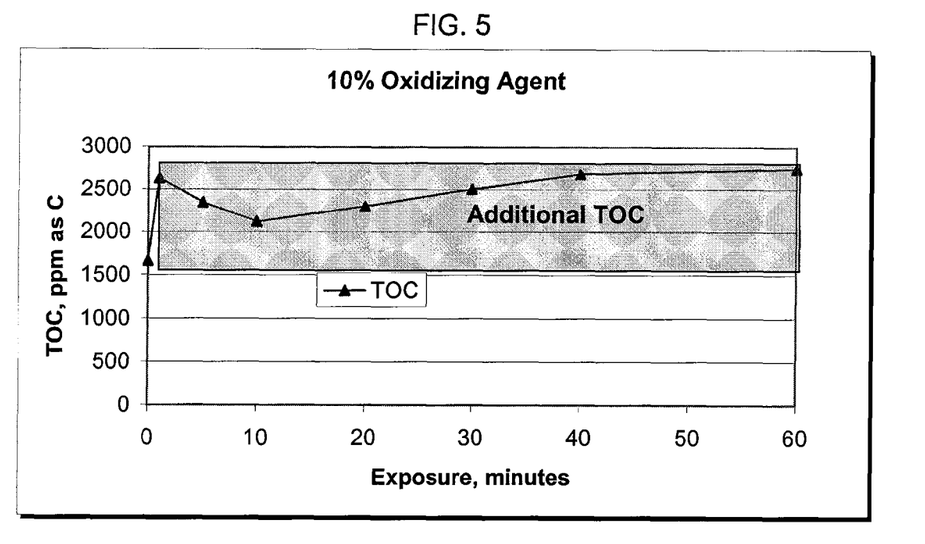

An unexpected result of the initial laboratory testing of the resins was the appearance of additional or hidden organic fouling upon treatment of the resins to concentrations of cleaning solution identified herein. The graphs of FIGS. 4 and 5 show this effect. In both of the laboratory runs illustrated by the data in FIGS. 4 and 5, the TOC was measured on the cleaning solutions, not the resin, except for the initial reading at time 0. The latter establishes the standard organic fouling level as measured by the 24-hour warm brine elution test. The cleaning solution appears to have changed the nature of the organic fouling such that more organics eluted from the resin and/or more organics were measured by the standard TOC analyzer. This effect is not difficult to understand in light of the mechanism of the TOC analyzer used in these tests. The Sievers Model 600 uses a combination of phosphoric acid and sodium perchlorate to oxidize organic molecules to $CO_2$ and $H_2O$, ultimate oxidation products. The $CO_2$ diffuses through a gas-specific membrane into an ultra-pure water loop. The change in conductivity in the ultra-pure loop produced by the presence of the $CO_2$ is quantitated and converted to TOC.

The initial oxidation of the organic material is an important feature of the present invention. Some organics are easy to oxidize. Glucose, for example, is used as a TOC standard due to its ease of oxidation. Hydroquinone, on the other hand, is resistant to acid oxidation and is considered a challenge to a TOC analyzer. Resistance to oxidation is partly due to aromatic structures in which the benzene ring and its substituents are resonance stabilized. Natural organics contain a mixture of aromatic and aliphatic structures. Aliphatic carbon sequences are not resonance stabilized and may represent readily oxidized points within the organics structure.

The natural organics in the resin samples analyzed as shown in FIGS. 4 and 5 appeared to have been initially resistant to oxidation and/or to removal from the resin. Upon exposure to the oxidizing agent as described herein, "additional" TOC appears in the analytical results.

Industrial field testing of the methods of the invention confirm the analytic results shown herein. The application was a cation/anion demineralizer system at a West Coast refinery. The three-year old anion resin had never been cleaned before and pre-cleaning analysis showed 6,000 ppm TOC on the resin, but with good laboratory capacity. Upon cleaning with a 6.5% solution of oxidizing agent, followed by neutralization with sodium sulfite, the post-cleaning organic fouling was reduced to 566 ppm, a 94% removal, as shown in Table 2. The refinery reported an immediate increase in throughput, which went from a pre-cleaning value of 500,000 gallons treated water to a post-cleaning value of over 1,000,000 gallons. This performance was checked three months after the cleaning, and the throughput was still over 1,000,000 gallons.

TABLE 2

| Strong Base | |
| --- | --- |
| Anion | TOC, ppm |
| After | 566 |
| Before | 6000 |
| % Removal | 94.3% |

The procedure was extremely effective in removing organics. In addition, analysis of the resin showed no damage to the total capacity or salt splitting capacity of the material. The lack of damage is also supported by the extraordinary increase in throughput that was achieved.

Further data from actual applications of the methods of the invention are provided in Table 3, affirming the increase in salt splitting capacity. Capacities are expressed in Kilograins as $CaCO_3$ per cubic foot.

TABLE 3

| Field Data from Anion Cleaning Procedure | | | | | |
| --- | --- | --- | --- | --- | --- |
| Before | | After | | | |
| Field Study 1 | | | | | |
| TOC | 7840 | TOC | 810 | Removal | 89.67% |
| Salt Split (S. S.) Capacity | 17.2 | S. S. Capacity | 20.05 | Change | +2.85 |
| Total Capacity | 21.6 | Total Capacity | 22.0 | Change | +.4 |
| Field Study 2 | | | | | |
| TOC | 7960 | TOC | 730 | Removal | 90.8% |
| S.S. Capacity | 16.4 | S.S. Capacity | 19.00 | Change | +2.6 |
| Total Capacity | 20.7 | Total Capacity | 21.8 | Change | +1.1 |
| Field Study 3 | | | | | |
| TOC | 8080 | TOC | 960 | Removal | 88.1% |
| S.S. Capacity | 14.00 | S.S. Capacity | 17.4 | Change | +3.4 |
| Total Capacity | 19.6 | Total Capacity | 20.5 | Change | +.9 |
| Field Study 4 | | | | | |
| TOC | 4520 | TOC | 620 | Removal | 86.3% |
| S.S. Capacity | 15.0 | S.S. Capacity | 20.9 | Change | +5.9 |
| Total Capacity | 20.9 | Total Capacity | 20.1 | Change | −.8 |
| Field Study 5 | | | | | |

TABLE 3-continued

Field Data from Anion Cleaning Procedure

| Before | | After | | | |
|---|---|---|---|---|---|
| TOC | 1215 | TOC | 123 | Removal | 89.9% |
| S.S. Capacity | 26.8 | S.S. Capacity | 27.5 | Change | +0.7 |
| Total Capacity | 30.3 | Total Capacity | 30.5 | Change | +0.2 |
| Moisture, | 44% | Moisture | 45.5% | Change | +1.5% |
| | | Field Study 6 | | | |
| TOC | 1950 | TOC | 145 | Removal | 92.6% |
| S.S. Capacity | 25.9 | S.S. Capacity | 25.7 | Change | −0.2 |
| Total Capacity | 29.9 | Total Capacity | 30.1 | Change | +0.2 |
| Moisture, | 45.7% | Moisture, | 46.3 | Change | +0.6% |
| | | Field Study 7 | | | |
| TOC | 1302 | TOC | 79 | Removal | 93.6% |
| S.S. Capacity | 27.2 | S.S. Capacity | 26.8 | Change | −0.4 |
| Total Capacity | 30.5 | Total Capacity | 30.3 | Change | −0.2 |
| Moisture | 55.3% | Moisture | 55.8% | Change | +0.5% |

Having now fully described the invention, it will be understood by those of ordinary skill in the art that the same can be performed within a wide and equivalent range of conditions, formulations and other parameters without affecting the scope of the invention or any embodiment thereof. Relevant portions of all patents, patent applications and publications cited herein, as generally indicated by the context of their citation, are fully incorporated by reference herein in their entirety.

What is claimed is:

1. A method of reducing natural organic fouling levels in a contaminated ion exchange resin comprising contacting the resin with an oxidizing agent solution, in concentrations between 0.1 and 12.5%, wherein a sodium salt of a polyethylene oxide (alpha-(nonylphenyl)-omega-hydroxy-poly(oxy-1,2-ethanediyl) is added along with the oxidizing agent solution.

2. A method of claim 1, wherein the polyethylene oxide (alpha-(nonylphenyl)-omega-hydroxy-poly(oxy-1,2-ethanediyl) is present at a concentration from about 50 ppm to about 5000 ppm in the oxidizing agent solution.

3. A method of reducing natural organic fouling levels in a contaminated ion exchange resin comprising contacting the resin with an oxidizing agent solution, in concentrations between 0.1 and 12.5%, wherein the oxidizing agent solution further comprises at least one free radical scavenger.

4. A method of claim 3, wherein the at least one free radical scavenger is selected from the group consisting of 4-oxo-TEMPO [4-oxo-2,2,6,6-tetramethyl-1-piperidine-4-one]; TEMPOL [4-hydroxy-TEMPO]; CP—H [1-hydroxy-c-carboxy-2,2,5,5-tetramethylpyrrolidone, HCl salt]; TEMPONE-H [1-hydroxy-2,2,6,6-tetramethyl-4-oxo-piperidine, HCl salt]; CDMIO-K [4-carboxy-2,2-dimethyl-2H-imidazole-1-oxide, K]; CM-H [1-hydroxy-3-methoxycarbonyl-2,2,5,5-tetramethylpyrrolidine, HCl salt]; DEPMO [5-(diisopropoxyphosphoryl)-5-methyl-1-pyrroline-N-oxide]; DIPPMP 0 [5-(diisopropoxyphosphoryl)-5-methyl-1-pyrroline-N-oxide]; DMPIO [2-dimethyl-4-phenyl-2H-imidazole-1-oxide]; and DEDC [diethyldithiocarbamic acid, sodium salt].

5. A method of claim 3, wherein the oxidizing agent solution comprises sodium hypochlorite.

* * * * *